United States Patent
Kollin et al.

(10) Patent No.: US 11,262,578 B2
(45) Date of Patent: Mar. 1, 2022

(54) PIXEL SAMPLING FOR SPATIAL LIGHT MODULATOR

(71) Applicant: Microsoft Technology Licensing, LLC, Redmond, WA (US)

(72) Inventors: Joel Steven Kollin, Seattle, WA (US); Andreas Georgiou, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/355,189

(22) Filed: Mar. 15, 2019

(65) Prior Publication Data
US 2020/0292812 A1    Sep. 17, 2020

(51) Int. Cl.
*G02B 27/00* (2006.01)
*G02F 1/133* (2006.01)
*G02F 1/1335* (2006.01)
*G02F 1/1362* (2006.01)

(52) U.S. Cl.
CPC ..... *G02B 27/0081* (2013.01); *G02B 27/0093* (2013.01); *G02F 1/13306* (2013.01); *G02F 1/133504* (2013.01); *G02F 1/133512* (2013.01); *G02F 1/133526* (2013.01); *G02F 1/136277* (2013.01); *G02F 2203/12* (2013.01); *G02F 2203/50* (2013.01)

(58) Field of Classification Search
CPC .......... H04N 13/0438; H04N 13/0484; H04N 13/0497; H04N 9/3194; G02B 27/2264; G02B 6/005; G02B 27/0172; G02B 27/0176
USPC ............................. 349/11, 13–14
See application file for complete search history.

(56) References Cited

U.S. PATENT DOCUMENTS

2009/0303597 A1* 12/2009 Miyawaki .............. G02B 27/46
 359/559
2011/0149018 A1*  6/2011 Kroll ....................... G03H 1/02
 348/40

(Continued)

FOREIGN PATENT DOCUMENTS

WO    2008049917 A1    5/2008

OTHER PUBLICATIONS

"International Search Report and Written Opinion Issued in PCT Application No. PCT/US2020/020572", dated Jul. 6, 2020, 33 Pages.

*Primary Examiner* — Charles S Chang
(74) *Attorney, Agent, or Firm* — Alleman Hall Creasman & Tuttle LLP (57) ABSTRACT

An image forming system includes a spatial light modulator (SLM) including a plurality of pixels. Each pixel is configured to diffract incident light and cause the diffracted light to exit the SLM, where a first diffraction order of light exiting the SLM passes through a first exit pupil and higher diffraction orders of light exiting the SLM pass through additional exit pupils having different positions from the first exit pupil. Control logic operatively coupled to the plurality of pixels is configured to control each pixel to control its modulation of the light incident on the pixel and cause the plurality of pixels to collectively form an image at each exit pupil. A light source is configured to emit incident light toward the SLM. A resampling layer is configured to subsample each pixel electrode with two or more samples per pixel to increase a spacing between each exit pupil.

20 Claims, 7 Drawing Sheets

(56) References Cited

U.S. PATENT DOCUMENTS

| | | | |
|---|---|---|---|
| 2016/0127717 A1* | 5/2016 | Petrov | G09G 3/36 |
| | | | 345/419 |
| 2017/0248825 A1 | 8/2017 | Georgiou et al. | |
| 2018/0113311 A1* | 4/2018 | Klug | H04N 13/128 |
| 2018/0120563 A1 | 5/2018 | Kollin et al. | |
| 2018/0373115 A1 | 12/2018 | Brown et al. | |
| 2019/0094803 A1* | 3/2019 | Futterer | G02B 27/0944 |
| 2019/0179152 A1* | 6/2019 | Vieira | G02B 27/0172 |
| 2019/0318677 A1* | 10/2019 | Lu | G06F 3/012 |
| 2020/0142355 A1* | 5/2020 | An | G03H 1/02 |

* cited by examiner

PIXEL SAMPLING FOR SPATIAL LIGHT MODULATOR

BACKGROUND

An optical system may include an image forming optic illuminated by an illumination source to produce a viewable image. Image forming optics may be transmissive, such that an image is formed by modulating light passing through the image-forming optic, or reflective, such that an image is formed by modulating light reflected from the image-forming optic.

DETAILED DESCRIPTION

Phase modulating devices, such as spatial light modulators (SLMs), may form an intensity distribution using diffraction. The intensity distribution may be an image that is used as an information display, for projecting an array of spots for depth sensing, used for illumination purposes in vehicles and buildings, etc. The phase modulating device can be either transmissive (like many large panel liquid crystal displays (LCDs)) or reflective, like Liquid Crystal over Silicon (LCoS) devices.

SLMs are often pixelated devices with square pixels placed on a regular grid. A spatially quantized device, with rows and columns of pixels, will typically form a central diffraction pattern and repetitions of this pattern in the horizontal and vertical axes. These repetitions originate from higher diffraction orders of light. For instance, a first diffraction order may represent an intended image, while higher diffraction orders of light may cause repetitions of the image to be formed at other positions. These higher diffraction orders are formed because of aliasing; any regularly sampled signal will have its spectrum repeated at a frequency equal to the sampling frequency.

Figure 1:
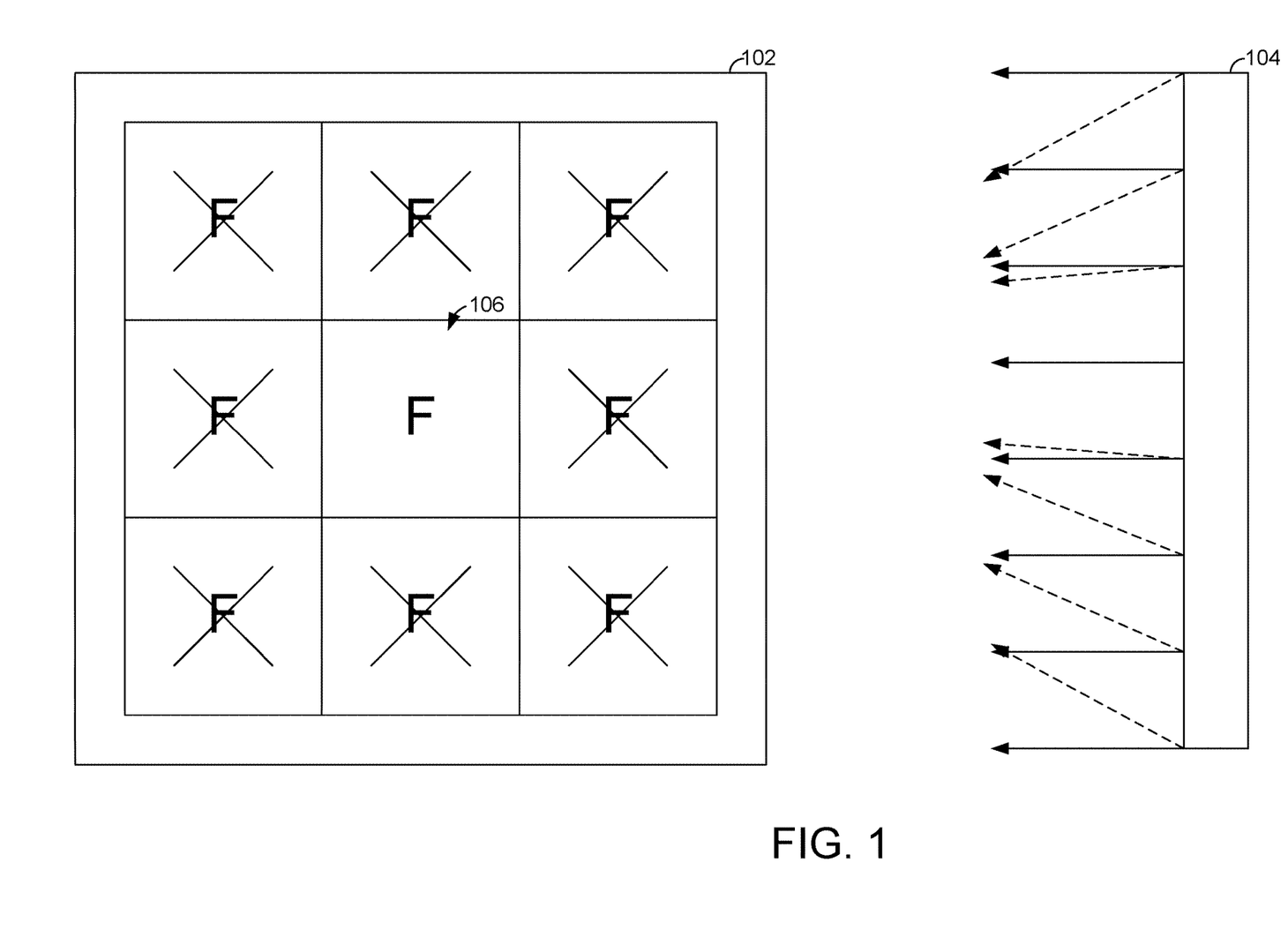
FIG. 1 shows an example hologram and image output representation.

Higher diffraction orders of light are often considered to be undesirable. For instance, such higher orders may form images that are overly close to a central image, causing both the central image and one or more repetitions of the image to enter a user eye at once. For example, FIG. 1 schematically shows a representation of an aliased image 102 produced by a hologram 104. As illustrated, the central, or desired, image 106 (e.g., the box with the letter "F" in the middle) is repeated as diffraction orders (e.g., as indicated by the "X" through the duplicated boxes) along horizontal and vertical axes of the image 102 (e.g., above, below, and to the side of the central, desired image). These repetitions of the central spectrum/signal are referred to as higher orders. The higher orders may be on the far field of the SLM (e.g., Fourier plane) or an intermediate plane. The central or the desired image may lay on the far field plane and/or an intermediate plane.

The higher orders would have the same intensity as the central image if the pixels had an infinitesimal size; e.g., if pixels were effectively point sources. However, as pixel size is finite, the diffraction pattern reduces in amplitude further away from the central order. This is called aperture theorem and in the specific case of Fraunhofer/Fourier holograms with square pixels, the image is multiplied by a sinc function, usually referred to as the sinc envelope. The higher orders are usually unwanted side effect of a diffractive system, and thus various techniques are often used to eliminate the unwanted orders. This can remove undesirable visual artifacts related to order spacing, as well as increase the power available for the central, desired order. However, such techniques often increase the bulk and/or complexity of the overall device.

Furthermore, it is a common goal in the design of image forming systems, such as holographic display devices, to increase the size of an "eyebox" in which a human eye pupil can receive image light from the system, especially when a large field-of-view (FOV) is desired. Image light created by such image forming systems is typically focused toward an exit pupil. If the exit pupil coincides with a human eye pupil then the human may perceive the intended image. Thus, expanding the eyebox may be achieved by creating more exit pupils and/or increasing the ability of the system to move an exit pupil to track a moving eye.

Accordingly, the present disclosure is directed to techniques for using the higher diffraction orders of light that are typically undesirable or eliminated. These higher orders are used to form additional exit pupils and thus increase the size of the eyebox. To this end, the image forming system includes a SLM having a resampling layer that samples each pixel of the SLM with two or more samples per pixel. This affects the spacing at which the image is repeated via the higher orders of light. As a result, multiple exit pupils may be formed having a sufficient spacing such that only one exit pupil coincides with a human eye pupil at a time, mitigating the undesirable visual artifacts that are commonly associated with the higher diffraction orders. Furthermore, the pixels are sampled such that each sample resembles a point source, thus increasing the brightness of the resulting higher diffraction orders. Because the samples still have a finite size and are not truly point sources, some amount of intensity loss may still be observed among the higher diffraction orders. However, given the small size of the samples, this amplitude loss may be mitigated such that the higher diffraction orders form sufficiently clear and bright images at respective exit pupils.

Figure 2A:
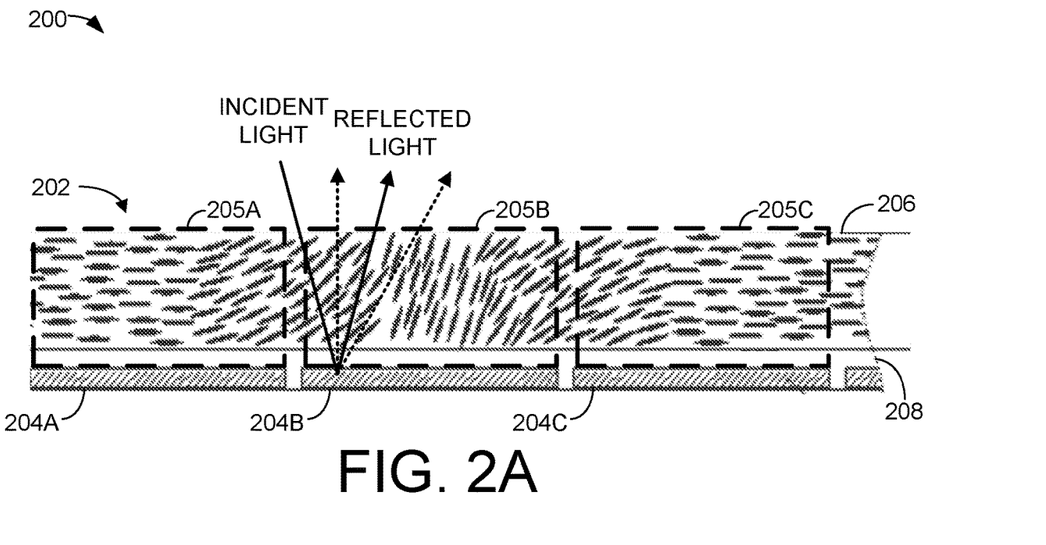
FIGS. 2A, 2B, and 2C schematically show an image forming system including a spatial light modulator (SLM).

FIG. 2A schematically shows portions of an example image forming system 200 including an SLM 202. SLM 202 may take any suitable form and use any suitable technology. Though the present disclosure primarily focuses on reflective SLMs (e.g., such as LCoS implementations), transmissive SLMs may instead be used. It will be understood that FIG. 2A shows the example image forming system 200 schematically and is not drawn to scale. FIGS. 2B, 3, 4A, 4B, 5B, and 6-8 are similarly schematic in nature.

Figure 2B:
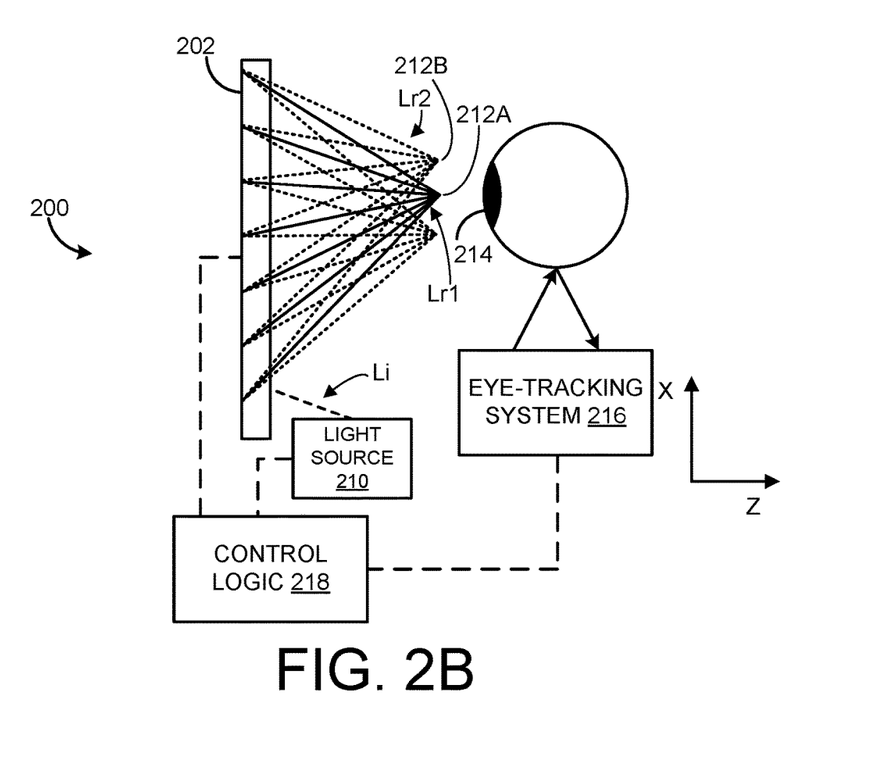

SLM 202 includes a plurality of pixel electrodes, including pixel electrodes 204A, 204B, and 204C. Each pixel electrode is configured to reflect light incident on the pixel electrode to exit the SLM. For instance, FIG. 2B shows a single beam of incident light reflecting from pixel electrode 204B. The reflected light includes a first order light beam shown as a solid line as well as two higher order light beams shown in dashed lines. As will be described in more detail below, each of these light beams may exit the SLM to pass through respective exit pupils. For instance, the first diffraction order of light may pass through a first exit pupil, while higher diffraction orders of light may pass through one or more additional exit pupils having different positions from the first exit pupil.

The plurality of pixel electrodes, in tandem with a phase modulating layer 206 of the SLM, may collectively comprise a plurality of individual pixels 205A-205C configured to diffract incident light and cause the diffracted light to exit the SLM. For instance, the plurality of pixels may be operatively coupled with control logic (e.g., via attachment to corresponding pixel electrodes), the control logic being usable to influence electrical conditions at each pixel electrode. This may in turn affect electrical conditions within the phase modulating layer (e.g., liquid crystal layer) 206 of the SLM. The phase modulating layer affects the phase of any incident/reflected light passing through it, thereby diffracting the light into various diffraction orders. Thus, by altering electrical conditions within the phase modulating layer via the pixel electrodes, the phase of the incident/reflected light may be changed. In this manner, the control logic may be used to control each pixel to control its modulation of the light incident on the pixel and cause the plurality of pixels to collectively form an image at each exit pupil. Depending on the implementation, each pixel of the SLM may correspond to a single pixel in the resulting image, or each pixel in the SLM may contribute to a plurality of pixels (e.g., some or all the pixels) in the resulting image.

Though not shown in FIG. 2A, the SLM may in some cases include an additional electrode, such as a ground electrode or common electrode, that may be disposed on the opposite side of the phase modulating layer from the plurality of pixel electrodes.

SLM 202 may also include a blurring layer 208 disposed between the pixel electrodes and phase modulating layer. Imperfections in a phase modulating layer, such as a liquid crystal layer, may result in undesirable visual artifacts in a formed image. For instance, a phase of the phase modulating layer may not change uniformly or optimally between pixels, causing aberrations to occur when the pixels are sampled near their edges. This can be mitigated through use of a blurring or interpolation layer, which may have a higher permittivity than the phase modulating layer. In this manner, the blurring layer may be configured to smooth phase transitions of a liquid crystal state of the phase modulating layer between localized areas associated with the pixel electrodes/pixels. The blurring layer may have any suitable arrangement and be constructed from any suitable materials. In one example, the blurring layer may be constructed from lead zirconate titanate (PZT). More details regarding the blurring layer are described in U.S. patent application Ser. No. 15/257,581, the entire contents of which are hereby incorporated herein by reference for all purposes.

FIG. 2B schematically shows another view of image forming system 200. System 200 is operable to position an exit pupil and provide an eyebox in which virtual imagery generated by the system is viewable. System 200 may be implemented in any suitable display device. For instance, the image forming system may be a component of a head-mounted display device (HMD) including a near-eye display (NED). Thus, image forming system 200 may in some cases correspond to a single eye and be paired within a NED and/or HMD with a second, similar display system for displaying imagery to a second eye. In other scenarios, however, the image forming system may be a component of other suitable display devices, such as mobile phones, television displays, computer monitors, etc.

As discussed above, image forming system 200 includes an SLM 202, which may take any suitable form. Image forming system 200 also includes a light source 210 configured to emit incident light (Li) toward the SLM. In some cases, and as will be discussed in more detail below with respect to FIG. 6, the light source may be configured to emit incident light toward the SLM at a dynamically controllable incidence angle. This may be used, for instance, to steer the position at which an exit pupil forms, thereby increasing the size of the eyebox. For instance, dynamically controlling the incidence angle may change the respective positions at which each exit pupil forms—e.g., an exit pupil corresponding to a first order of light as well as additional exit pupils corresponding to higher orders of light. As one example, the light source may include a microprojector and a steerable micromirror, although any suitable light-producing devices and optics may be used. The light source may output light having any suitable wavelength or spectrum, and in some cases may output collimated light.

In the depicted example, light emitted from light source 210 enters SLM 202. The input angle at which light is introduced into the SLM may be controllable in various manners. As one example, the light source may include a steerable micromirror controllable to change the angle at which light from a microprojector is introduced into SLM 202 to steer an exit pupil of the image forming system 200. In other examples, and as will be described in more detail below with respect to FIG. 7, different light sources arranged at different angles may be used to vary an input angle by selecting which light source to use for illumination at any given time, and/or any other suitable method of varying a light input angle may be used.

While not depicted in FIGS. 2B any suitable elements may be disposed between the light source and SLM. For instance, light from the light source may first pass through a waveguide having suitable in-coupling and out-coupling elements. Furthermore, although FIG. 2B only shows a single beam of light entering the SLM, this is only for the sake of visual clarity. In practical implementations, any suitable portion of the SLM may be illuminated by incident light from the light source, including the entire SLM.

For the light input angle illustrated in FIG. 2B, a portion of the light exiting the SLM, corresponding to a first diffraction order of light (Lr1) converges toward an exit pupil 212 proximate a human eye pupil 214. Light passing through the exit pupil may therefore enter the eye via human eye pupil 214 and strike the retina, causing the light to be perceived as an image. Though FIG. 2B depicts the light focusing at a point outside of the human eye pupil, this is for illustration purposes only. In practical use, the light may converge toward a focal point that lies before, within, or beyond the human eye. In some examples, the exit pupil formed may coincide with the human eye pupil. Light entering the human eye pupil may be focused by the eye lens to modify the light's focal point, for example to focus the light at the retina.

FIG. 2B also shows another exit pupil 212B formed by light representing a higher diffraction order (Lr2). In the illustrated example, both exit pupils 212A and 212B are proximate the human eye pupil. Thus, light passing through both exit pupils may enter the human eye pupil and be perceived as a doubled image. However, as will be discussed in more detail below, the spacing between exit pupils corresponding to different diffraction orders of light may be increased by subsampling pixels of the SLM.

Furthermore, in the illustrated example, light exiting the SLM is focused toward respective focal points. To this end, the image forming system may include any suitable focal optics in the light path between the SLM and human eye. For instance, the light may pass through any static lenses, dynamic lenses, holograms (e.g., thin or thick Bragg holograms), waveguides, etc., en route to the human eye. In this manner, the SLM need not be positioned directly in front of the eye as is shown, but rather may have another suitable position, and light exiting the SLM may take any suitable path and pass through any suitable optics before reaching the exit pupil.

Figure 3:
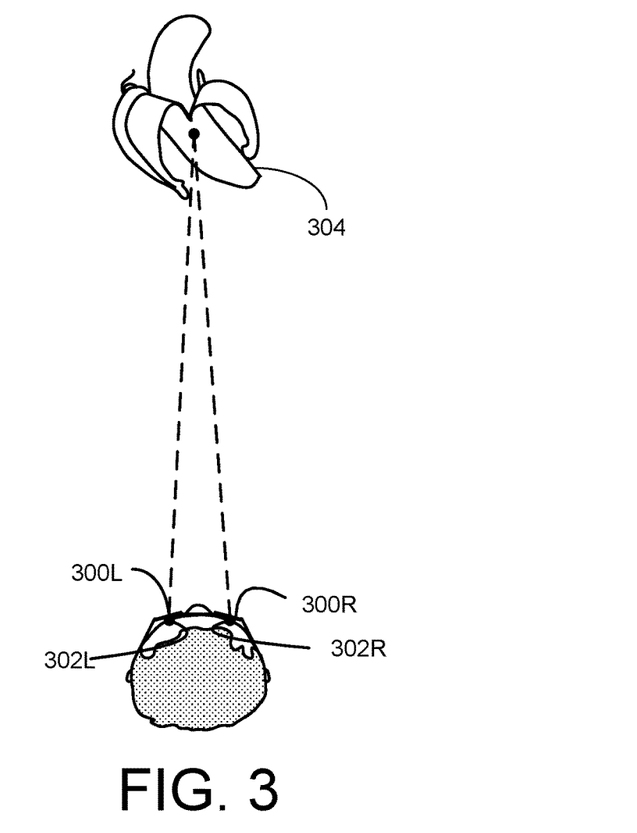
FIGS. 3 schematically illustrate presentation of virtual imagery using a head-mounted display device (HMD).

As discussed above, in some cases the image forming system may be included as part of an HMD or NED, in which paired images are presented to two eyes at once. When the two images are stereoscopically offset, the virtual imagery may be perceived as a three-dimensional object that appears to exist at a three-dimensional position within the wearer's environment. This is shown in FIG. 3, which shows an overhead view of a wearer using a NED. As shown, the NED includes two image forming systems including a first system 300L, positioned in front of the wearer's left eye pupil 302L, and a second image forming system 300R positioned in front of right eye pupil 302R. It will be understood that image forming system 200 shown in FIGS. 2A and 2B may be either of systems 300L and 300R. Similarly, human eye pupil 214 shown in FIG. 2B may be either of pupil 302L and 302R shown in FIG. 3A. A virtual image 340 is visible to the wearer as a virtual object that appears to be present at a three-dimensional position some distance away from the wearer. As discussed above, such an image may be formed via light exiting an SLM toward exit pupils formed by the image forming systems and in turn entering human eye pupils 300L and 300R.

Returning to FIG. 2B, in some examples, image forming system 200 may vary the exit pupil location based on the location of the user eye pupil. Thus, FIG. 2B shows an eye-tracking system 216 configured to track a current position of the human eye pupil. In some examples, eye-tracking system 216 may include a light source that projects light onto the eye, and an image sensor that captures light reflected from the cornea, or other structures within the eye, with which glints and/or other features can be identified to determine the pupil location. The pupil location identified by eye-tracking system 216 may be provided to control logic 218, which may be configured to set a current angle of the incident light emitted by the light source, thereby causing an exit pupil to form proximate to the current position of the human eye pupil.

Furthermore, control logic 218 may be operatively coupled to the plurality of pixels via coupling with the pixel electrodes of the SLM. By altering electrical conditions at each pixel electrode, the control logic may influence light modulation occurring at each pixel. In this manner, the plurality of pixels can be made to collectively form an image at each exit pupil (e.g., each exit pupil corresponding to different diffraction orders of light). Controller 218 may be implemented as any suitable processing componentry, including logic machine 802 described below with respect to FIG. 8.

Figure 2C:
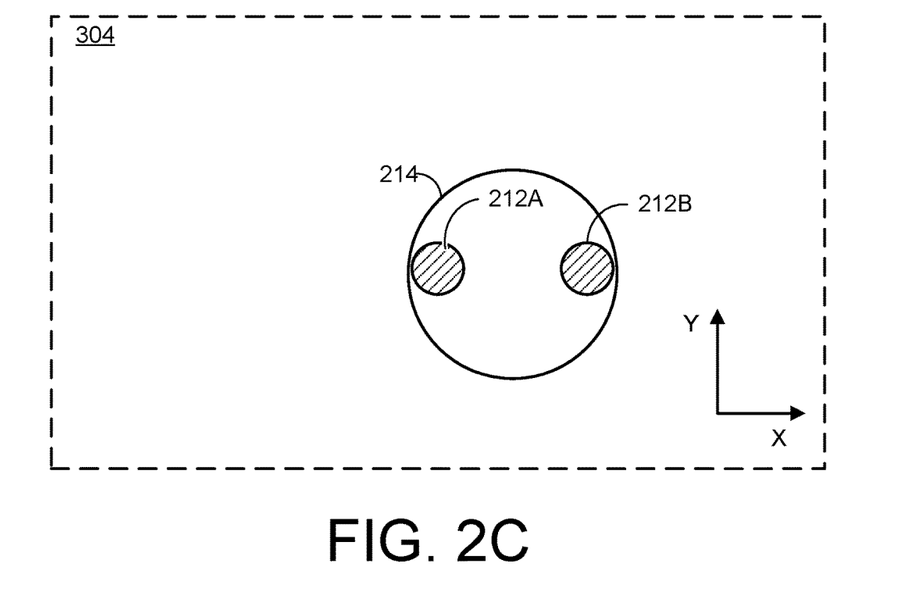

As noted above, in FIG. 2B two exit pupils 212A and 212B are proximate to the same human eye pupil 214. This is also shown in FIG. 2C, which shows an example eyebox 220 in which human eye pupil can receive light from the image forming system 200. For the sake of simplicity, as used herein, an "eyebox" will typically refer to a two-dimensional rectangular region of space, although in practical applications an eyebox may have any suitable shape and dimensions.

In FIG. 2C, both of exit pupils 212A and 212B are proximate to human eye pupil 214. As such, light passing through both exit pupils may be received by the human eye at the same time. Thus, the user may perceive two copies of the same image corresponding to different diffraction orders of light.

Figure 4A:
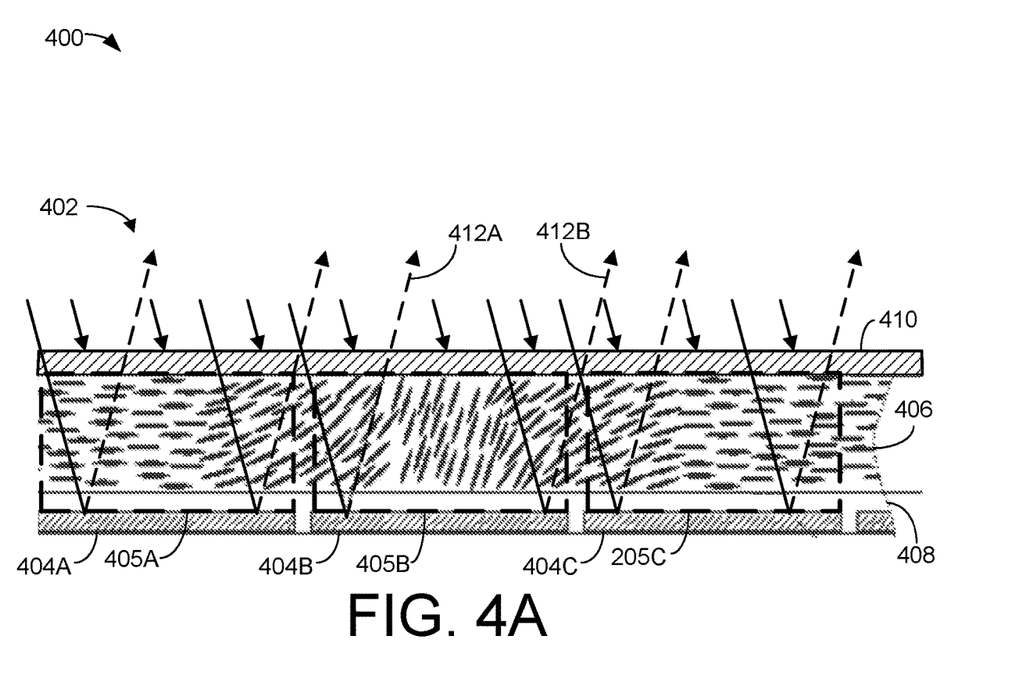
FIGS. 4A and 4B illustrate sampling of pixels of a SLM.

To address this, as discussed above, each pixel of the SLM may be subsampled with two or more discrete samples per pixel. This is schematically illustrated in FIG. 4A, which shows portions of another example image forming system 400 including an SLM 402. As with SLM 202, SLM 402 includes a plurality of pixel electrodes 404A-404C, a phase modulating layer 406, and a blurring layer 408. The pixel electrodes and phase modulating layer collectively comprise a plurality of pixels 405A-405C configured to diffract and modulate incident light to form an image. However, SLM 402 also includes a resampling layer 410 disposed between the light source and phase modulating layer. The resampling layer interacts with the incident light such that each pixel of the plurality is selectively sampled at two or more specific regions. Focusing specifically on pixel electrode 404B, a first light beam is reflected as a first sample 412A, while a second light beam is reflected from the same pixel electrode as a second sample 412B.

Figure 4B:
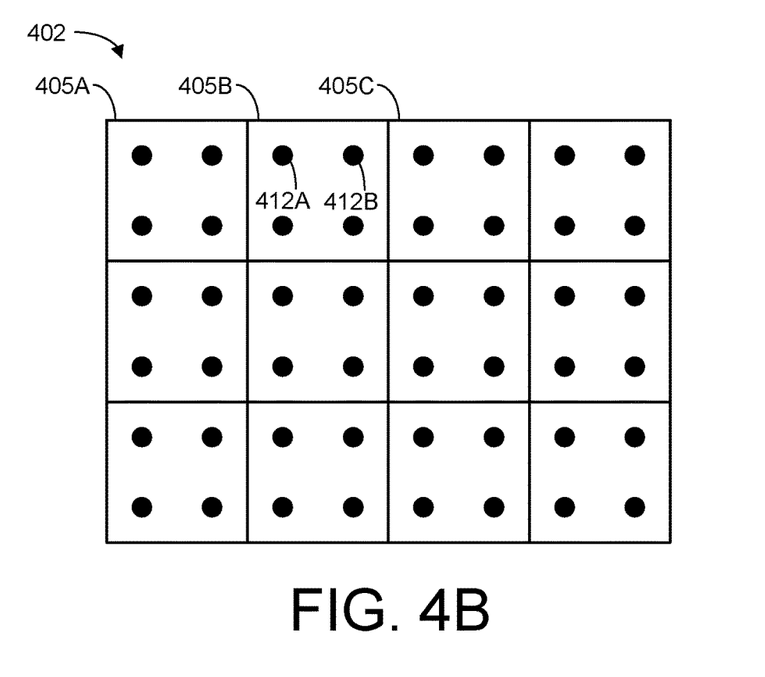

FIG. 4B shows the plurality of pixels from another angle. Specifically, FIG. 4B shows each of pixel electrodes 404A, 404B, and 404C arranged in a regular grid along with a plurality of other pixels. Sampling locations on each pixel, including samples 412A and 412B, are indicated with black circles. As shown, each pixel is sampled four times, although this is not limiting. Rather, any suitable number of samples may be used per pixel depending on a desired spacing between the various diffraction orders of light exiting the SLM.

The specific positions of each sampling location on the various pixels are also not limiting. As discussed above, imperfections in a phase modulation layer, such as a liquid crystal layer, may cause visual aberrations when pixels are sampled near their edges. Thus, it may in some cases be desirable to sample a central region of each pixel. However, such visual aberrations may be mitigated through use of a blurring layer in the SLM, potentially allowing edge regions of each pixel to be sampled without introducing aberrations.

The spacing between each pixel sample may be set based on a size of each pixel as well as a desired exit pupil spacing. In the illustrated example, the intra-pixel spacing between each of the two or more samples per pixel is substantially the same for each of the plurality of pixels. Furthermore, the two or more samples for each pixel collectively form a regular sample grid. In other words, a spacing between two adjacent samples is substantially the same regardless of whether the two adjacent pixels are on a same pixel or adjacent pixels. However, this is not limiting. In other examples, any suitable spacing and sample geometry may be used, including irregular spacings.

The resampling layer used to sample each pixel may take any suitable form. In one example, the resampling layer may take the form of a mask that selectively blocks incident light from reaching at least a portion of each of the plurality of pixels. Alternatively, the resampling layer may take the form of an optical array element, such as a microlens array that focuses incident light at specific portions of each pixel. This may ensure that more of the incident light is used, rather than being blocked by a mask. As another example, the resampling layer may take the form of a diffractive optical element, such as a holographic optical element (HOE)—e.g., a thick or thin Bragg hologram. Additionally, or alternatively, the resampling layer may be configured to modify the geometric phase of the incident light, such as a metamaterial. When a dynamic hologram or geometric phase metamaterial is used, the sample spacing on the pixels may be dynamically changed. In other words, the per-pixel sample spacing or sample quantity with which each pixel is subsampled by the resampling layer may be dynamically controllable—e.g., to affect the angles at which each order of diffracted light exits the SLM. Thus, the spacing between each exit pupil formed by the various diffraction orders of light may be changed dynamically, for instance to follow a moving eye pupil.

In one example, the resampling layer may take the form of a surface relief grating (SRG) or out-coupling layer on a waveguide configured to transmit light via total internal reflection. If the outcoupling from the waveguide is relatively weak, light reflecting back from the SLM may be weakly affected by the outcoupling structure en route to the eye. This may be addressed by using an outcoupler that is polarization dependent. For instance, in addition to affecting the wavelength of incident light, the SLM may affect the polarity of light it reflects, such that the light is no longer affected by the waveguide outcoupler. Furthermore, when an outcoupling waveguide is used, the outcoupler may be designed such that the resampling for red, green, and blue wavelengths is different and inversely proportional to wavelength, such that order spacing is substantially identical for all three colors.

Returning briefly to FIG. 4A, only one diffraction order of light (i.e., the first order) is shown reflecting from each pixel electrode. However, this is only for the sake of visual clarity. Rather, as discussed above, any regularly sampled signal will have its spectrum repeated in a manner that is dependent on the sampling frequency. Accordingly, increasing the sampling frequency of the grid of pixels changes the spacing between the various diffraction orders of light exiting the SLM. In practice, this increases the spacing between exit pupils that the various diffraction orders of light pass through. In this manner, the size of the eyebox can effectively be expanded, as the various diffraction orders of light can be used to form additional exit pupils with sufficient spacing that the human eye pupil only ever receives light passing through one of the exit pupils.

Figure 5A:
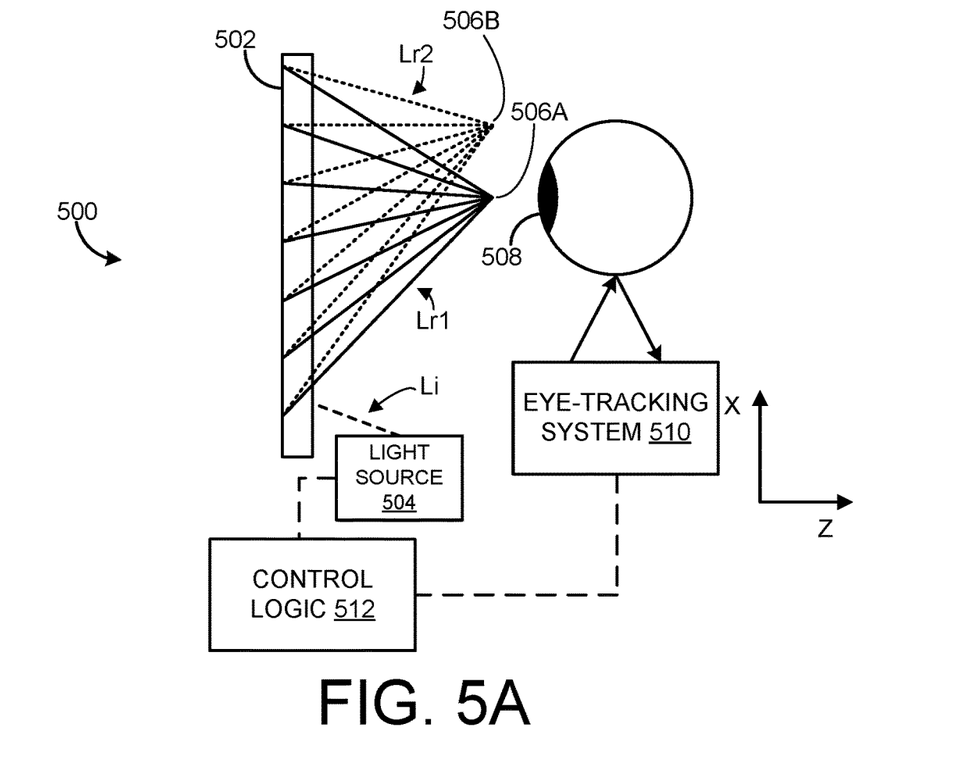
FIGS. 5A and 5B schematically illustrate spacing of exit pupils formed by an image forming system.
Figure 5B:
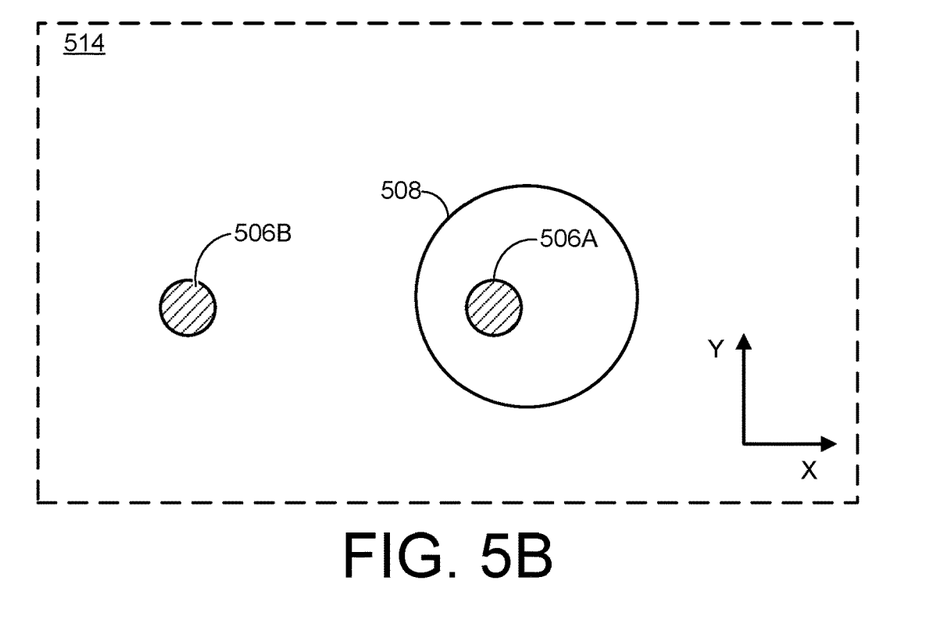
Figure 6:
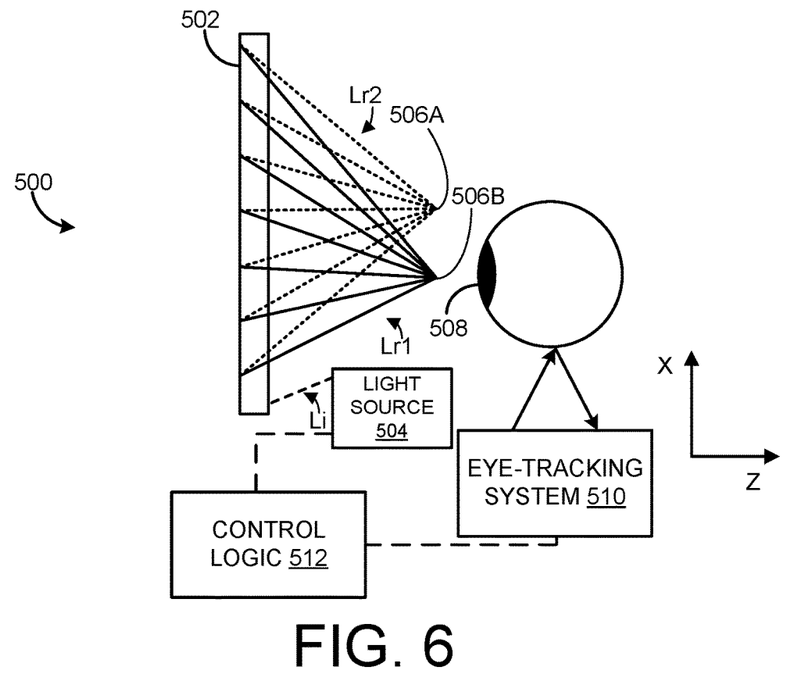
FIG. 6 schematically shows an example image forming system with a light source configured to emit incident light at a dynamically controllable incidence angle.

This is illustrated in FIGS. 5A and 5B. FIG. 5A schematically shows another example image forming system 500 including an SLM 502. Incident light (Li) emitted by a light source 504 is diffracted by pixels of the SLM and passes through exit pupils 506A and 506B. Specifically, a first diffraction order of light passes through exit pupil 506A, which is proximate to a human eye pupil 508, while a higher diffraction order of light passes through exit pupil 506B, which is not proximate to the human eye pupil.

This is also shown in FIG. 5B, which shows an eyebox 514. In FIG. 5B, first exit pupil 506A is proximate to human eye pupil 508, while second exit pupil 506B is not. In other words, the spacing between each exit pupil at which the image is formed is greater than the human eye pupil width. The system may in some cases set this spacing to be greater than a predetermined human eye pupil width—for instance, an eye pupil width corresponding to an average eye pupil size, a $99^{th}$ percentile eye pupil size under ordinary daylight conditions, a specific eye pupil width corresponding to a known user, a measured eye pupil width for a current user, or another suitable spacing may be used.

As indicated above, in some scenarios, various techniques may be used to further expand the eyebox by moving the positions at which each exit pupil is formed. For instance, FIG. 6 again shows image forming system 500 of FIG. 5A. However, in FIG. 6, the angle of incidence of light entering the SLM has been changed. In other words, light source 504 is configured to emit the incident light at a dynamically controllable angle. As a result, the angles at which all light exits the SLM, including all diffraction orders of light, has changed. This in turn changes the positions of each respective exit pupil that the various diffraction orders of light pass through, as exit pupils 506A and 506B are at different positions from what is shown in FIG. 5A. This may be done, for example, to account for a changed position of human eye pupil 508 for instance based on feedback provided by eye-tracking system 510.

Figure 7:
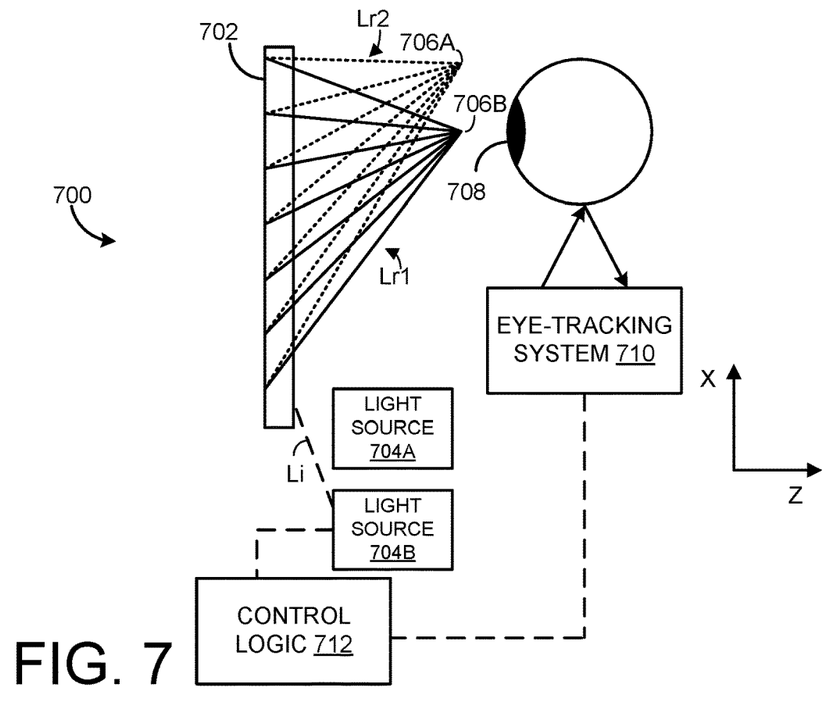
FIG. 7 schematically shows an example image forming system with two light sources.

Additionally, or alternatively, an image forming system may include more than one light source. For instance, FIG. 7 schematically shows another example image forming system 700 including an SLM 702, light source 704A, eye-tracking system 710, and control logic 712. Light exiting the SLM forms exit pupils 706A and 706B on its way toward human eye pupil 708. However, image forming system 700 also includes a second light source 704B configured to emit incident light toward the SLM at a different incident angle from first light source 704A. As a result, each of the first exit pupil (corresponding to the first diffraction order of light) and one or more additional exit pupils (corresponding to one or more higher diffraction orders of light) may be formed at respective first positions when the first light source emits incident light toward the SLM. By contrast, each exit pupil may be formed at respective second positions when the second light source emits incident light toward the SLM. In this manner, the positions at which each of the exit pupils form may be switched between two or more discrete positions by switching which light source is active, for instance based on feedback from eye-tracking system 710.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
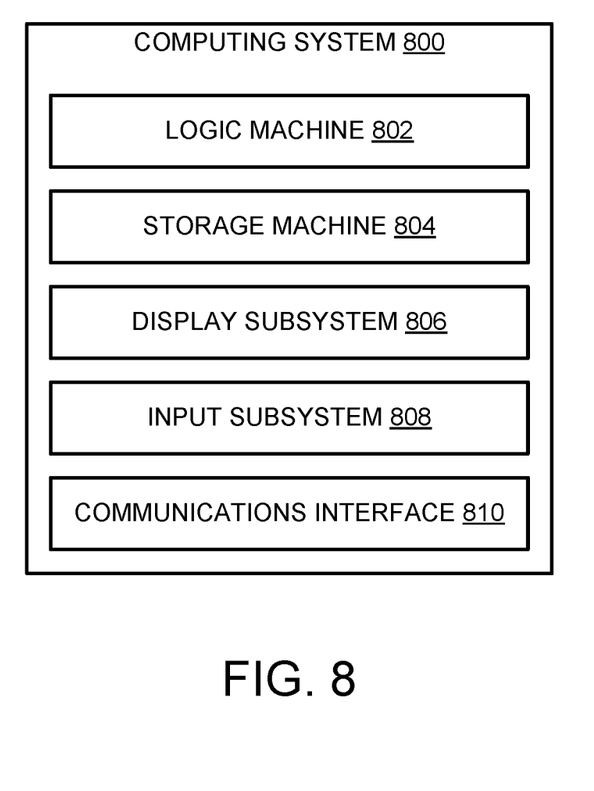
FIG. 8 schematically shows an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In an example, an image forming system comprises: a spatial light modulator (SLM) including a plurality of pixels configured to diffract incident light and cause the diffracted light to exit the SLM, where a first diffraction order of light exiting the SLM passes through a first exit pupil and higher diffraction orders of light exiting the SLM pass through one or more additional exit pupils having different positions from the first exit pupil; control logic operatively coupled to the plurality of pixels, the control logic configured to control each pixel to control its modulation of the light incident on the pixel and cause the plurality of pixels to collectively form an image at each exit pupil; a light source configured to emit incident light toward the SLM; and a resampling layer disposed between the light source and SLM, the resampling layer configured to subsample each of the plurality of pixels with two or more discrete samples per pixel to affect an angle of each diffraction order of light exiting the SLM, thereby increasing a spacing between each exit pupil at which the image is formed. In this example or any other example, the SLM is a liquid crystal on silicon (LCoS) display. In this example or any other example, the spacing between each exit pupil at which the image is formed is greater than a predetermined human eye pupil width. In this example or any other example, the light source is configured to emit incident light toward the SLM at a dynamically controllable incidence angle. In this example or any other example, the light source includes a steerable micromirror. In this example or any other example, dynamically controlling the incidence angle changes each respective position at which the first exit pupil and one or more additional exit pupils are formed. In this example or any other example, the image forming system further comprises a second light source configured to emit incident light toward the SLM from a different incidence angle or position from the light source. In this example or any other example, each of the first exit pupil and one or more additional exit pupils are formed at respective first positions when the light source emits incident light toward the LCoS display, and each of the first exit pupil and one or more additional exit pupils are formed at respective second positions when the second light source emits incident light toward the LCoS display. In this example or any other example, an intra-pixel spacing between each of the two or more samples per pixel is substantially the same for each of the plurality of pixels. In this example or any other example, the two or more samples for each pixel collectively form a regular sample grid, such that a spacing between two adjacent samples is substantially the same whether the two adjacent samples are on a same pixel or adjacent pixels. In this example or any other example, the SLM includes a phase modulating layer and a blurring layer, the blurring layer having a higher permittivity than the phase modulating layer, and the blurring layer is configured to smooth phase transitions of a liquid crystal state in the phase modulating layer between localized areas associated with the pixels. In this example or any other example, the resampling layer is a microlens array configured to focus incident light at specific portions of each pixel of the plurality of pixels. In this example or any other example, the resampling layer is a mask that selectively blocks incident light from reaching at least a portion of each of the plurality of pixels. In this example or any other example, the resampling layer is a surface relief grating (SRG) on a waveguide configured to transmit light via total internal reflection. In this example or any other example, the resampling layer is a diffractive optical element. In this example or any other example, the resampling layer modifies a geometric phase of the incident light.

In an example, an image forming system comprises: a liquid crystal on silicon (LCoS) display including a plurality of pixels configured to diffract light incident on the pixel and cause the diffracted light to exit the LCoS display, where a first diffraction order of light exiting the LCoS display passes through a first exit pupil and higher diffraction orders of light exiting the LCoS display pass through one or more additional exit pupils having different positions from the first exit pupil; control logic operatively coupled to the plurality of pixels, the control logic configured to control each pixel to control its modulation of the light incident on the pixel and cause the plurality of pixels to collectively form an image at each exit pupil; a light source configured to emit incident light toward the LCoS display; and an optical array element disposed between the light source and LCoS display, the optical array element configured to selectively redirect the incident light to subsample each of the plurality of pixels with two or more discrete samples per pixel to affect an angle of each diffraction order of light exiting the LCoS display, thereby increasing a spacing between each exit pupil at which the image is formed. In this example or any other example, the light source is configured to emit incident light toward the LCoS display at a dynamically controllable incidence angle, and where dynamically controlling the incidence angle changes each respective position at which the first exit pupil and one or more additional exit pupils are formed. In this example or any other example, the image forming system further comprises a second light source configured to emit incident light toward the LCoS display at a different incidence angle from the light source, where each of the first exit pupil and one or more additional exit pupils are formed at respective first positions when the light source emits incident light toward the LCoS display, and each of the first exit pupil and one or more additional exit pupils are formed at respective second positions when the second light source emits incident light toward the LCoS display.

In an example, a head-mounted display device (HMD) comprises: a spatial light modulator (SLM) including a plurality of pixels configured to diffract incident light and cause the diffracted light to exit the SLM, such that a first diffraction order of light exiting the SLM passes through a first exit pupil and higher diffraction orders of light exiting the SLM pass through one or more additional exit pupils having different positions from the first exit pupil; control logic operatively coupled to the plurality of pixels, the control logic configured to control each pixel to control its modulation of the light incident on the pixel and cause the plurality of pixels to collectively form an image at each exit pupil; a light source configured to emit incident light toward the SLM; and a dynamic resampling layer disposed between the light source and SLM, the dynamic resampling layer configured to subsample each of the plurality of pixels with two or more discrete samples per pixel to affect an angle of each diffraction order of light exiting the SLM, thereby increasing a spacing between each exit pupil at which the image is formed, where the dynamic resampling layer is controllable by the control logic to change a per-pixel sample spacing or sample quantity with which the dynamic resampling layer subsamples each of the plurality of pixels to dynamically affect the angle of each diffraction order of light exiting the SLM, thereby affecting the spacing between each exit pupil at which the image is formed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An image forming system, comprising:
a spatial light modulator (SLM) including a plurality of pixels configured to diffract incident light and cause the diffracted light to exit the SLM, where a first diffraction order of light exiting the SLM passes through a first exit pupil and higher diffraction orders of light exiting the SLM pass through two or more distinct additional exit pupils having different, non-overlapping positions from the first exit pupil within an eyebox, least one of the non-overlapping positions of the two or more distinct additional exit pupils differing from a current eye position of a human eye relative to the eyebox;
control logic operatively coupled to the plurality of pixels, the control logic configured to control each pixel to control its modulation of the light incident on the pixel and cause the plurality of pixels to collectively form an image at each exit pupil, the image being viewable by the human eye at any of the first exit pupil and the two or more distinct additional exit pupils such that, at each of the different, non-overlapping positions within the eyebox, the image is viewable by the human eye by way of a different exit pupil corresponding to a different diffraction order of the light exiting the SLM;

a light source configured to emit incident light toward the SLM; and a resampling layer disposed between the light source and SLM, the resampling layer configured to subsample each of the plurality of pixels at two or more spatially different sampling locations on each pixel to affect an angle of each diffraction order of light exiting the SLM, thereby increasing a spacing between the different, non-overlapping positions of each exit pupil at which the image is formed within the eyebox.

2. The image forming system of claim 1, where the SLM is a liquid crystal on silicon (LCoS) display.

3. The image forming system of claim 1, where the spacing between each exit pupil at which the image is formed is greater than a predetermined human eye pupil width, such that only one exit pupil of the first exit pupil and two or more distinct additional exit pupils is formed within the human eye.

4. The image forming system of claim 1, where the light source is configured to emit incident light toward the SLM at a dynamically controllable incidence angle.

5. The image forming system of claim 4, where the light source includes a steerable micromirror.

6. The image forming system of claim 4, where dynamically controlling the incidence angle changes each respective position at which the first exit pupil and two or more distinct additional exit pupils are formed.

7. The image forming system of claim 1, further comprising a second light source configured to emit incident light toward the SLM from a different incidence angle or position from the light source.

8. The image forming system of claim 7, where the higher diffraction orders of light are not filtered out by the image forming system but instead form images at each of the two or more distinct additional exit pupils, each of the first exit pupil and two or more distinct additional exit pupils are formed at respective first positions when the light source emits incident light toward the LCoS display, and each of the first exit pupil and two or more distinct additional exit pupils are formed at respective second positions when the second light source emits incident light toward the LCoS display.

9. The image forming system of claim 1, where an intra-pixel spacing between each of the two or more spatially different sampling locations is substantially the same for each of the plurality of pixels.

10. The image forming system of claim 1, where the two or more spatially different sampling locations on each pixel collectively form a regular sample grid, such that a spacing between two adjacent sampling locations is substantially the same whether the two adjacent sampling locations are on a same pixel or adjacent pixels.

11. The image forming system of claim 1, where the SLM includes a phase modulating layer and a blurring layer, the resampling layer disposed above the phase modulating layer, the blurring layer having a higher permittivity than the phase modulating layer, and the blurring layer is configured to smooth phase transitions of a liquid crystal state in the phase modulating layer between localized areas associated with the pixels.

12. The image forming system of claim 1, where the resampling layer is a microlens array configured to focus incident light at specific portions of each pixel of the plurality of pixels.

13. The image forming system of claim 1, where the resampling layer is a mask that selectively blocks incident light from reaching at least a portion of each of the plurality of pixels.

14. The image forming system of claim 1, where the resampling layer is a surface relief grating (SRG) on a waveguide configured to transmit light via total internal reflection.

15. The image forming system of claim 1, where the resampling layer is a diffractive optical element.

16. The image forming system of claim 1, where the resampling layer modifies a geometric phase of the incident light.

17. An image forming system, comprising:

a liquid crystal on silicon (LCoS) display including a plurality of pixels configured to diffract light incident on the pixel and cause the diffracted light to exit the LCoS display, where a first diffraction order of light exiting the LCoS display passes through a first exit pupil and higher diffraction orders of light exiting the LCoS display pass through two or more distinct additional exit pupils having different, non-overlapping positions from the first exit pupil within an eyebox, at least one of the non-overlapping positions of the two or more distinct additional exit pupils differing from a current eye position of a human eye relative to the eyebox;

control logic operatively coupled to the plurality of pixels, the control logic configured to control each pixel to control its modulation of the light incident on the pixel and cause the plurality of pixels to collectively form an image at each exit pupil, the image being viewable by the human eye at any of the first exit pupil and the two or more distinct additional exit pupils such that, at each of the different, non-overlapping positions within the eyebox, the image is viewable by the human eye by way of a different exit pupil corresponding to a different diffraction order of the light exiting the LCoS display;

a light source configured to emit incident light toward the LCoS display; and an optical array element disposed between the light source and LCoS display, the optical array element configured to selectively redirect the incident light to subsample each of the plurality of pixels at two or more spatially different sampling locations on each pixel to affect an angle of each diffraction order of light exiting the LCoS display, thereby increasing a spacing between the different, non-overlapping positions of each exit pupil at which the image is formed within the eyebox.

18. The image forming system of claim 17, where the light source is configured to emit incident light toward the LCoS display at a dynamically controllable incidence angle, and where dynamically controlling the incidence angle changes each respective position at which the first exit pupil and one or more additional exit pupils are formed.

19. The image forming system of claim 17, further comprising a second light source configured to emit incident light toward the LCoS display at a different incidence angle from the light source, where each of the first exit pupil and two or more distinct additional exit pupils are formed at respective first positions when the light source emits incident light toward the LCoS display, and each of the first exit pupil and two or more distinct additional exit pupils are formed at respective second positions when the second light source emits incident light toward the LCoS display.

20. A head-mounted display device (HMD), comprising:
a spatial light modulator (SLM) including a plurality of pixels configured to diffract incident light and cause the diffracted light to exit the SLM, such that a first diffraction order of light exiting the SLM passes through a first exit pupil and higher diffraction orders of light exiting the SLM pass through two or more distinct additional exit pupils having different, non-overlapping positions from the first exit pupil within an eyebox, least one of the non-overlapping positions of the two or more distinct additional exit pupils differing from a current eye position of a human eye relative to the eyebox;
control logic operatively coupled to the plurality of pixels, the control logic configured to control each pixel to control its modulation of the light incident on the pixel and cause the plurality of pixels to collectively form an image at each exit pupil, the image being viewable by the human eye at any of the first exit pupil and the two or more distinct additional exit pupils such that, at each of the different, non-overlapping positions within the eyebox, the image is viewable by the human eye by way of a different exit pupil corresponding to a different diffraction order of the light exiting the SLM;
a light source configured to emit incident light toward the SLM; and
a dynamic resampling layer disposed between the light source and SLM, the dynamic resampling layer configured to subsample each of the plurality of pixels at two or more spatially different sampling locations on each pixel to affect an angle of each diffraction order of light exiting the SLM, thereby increasing a spacing between the different, non-overlapping positions of each exit pupil at which the image is formed within the eyebox, where the dynamic resampling layer is controllable by the control logic to change a per-pixel sample spacing or sample quantity with which the dynamic resampling layer subsamples each of the plurality of pixels to dynamically affect the angle of each diffraction order of light exiting the SLM, thereby affecting the spacing between each exit pupil at which the image is formed.

* * * * *